H. & R. PINEGAR.
SMOKE PRODUCING DEVICE.
APPLICATION FILED JAN. 31, 1908.
928,695.
Patented July 20, 1909.
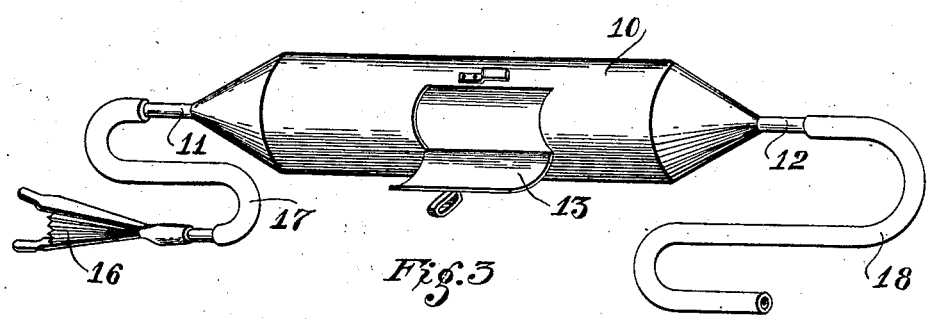
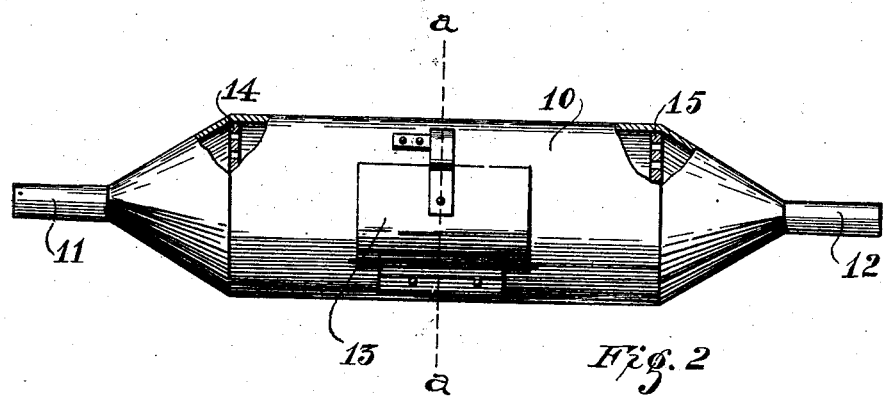
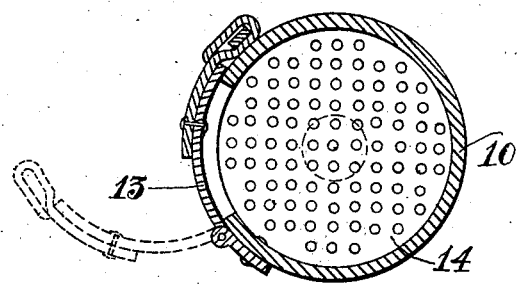
Witnesses
Inventors
Henry Pinegar and Reuben Pinegar
by Bell G. Roe
Attorney

UNITED STATES PATENT OFFICE.

HENRY PINEGAR AND REUBEN PINEGAR, OF CHESTERFIELD, IOWA.

SMOKE-PRODUCING DEVICE.

No. 928,695.         Specification of Letters Patent.         Patented July 20, 1909.

Application filed January 31, 1908. Serial No. 413,573.

*To all whom it may concern:*

Be it known that we, HENRY PINEGAR and REUBEN PINEGAR, citizens of the United States, residing in Chesterfield, county of Polk, and State of Iowa, have invented a new and useful Improvement in Smoke-Producing Devices, of which the following is a specification.

The object of our invention is to produce a device adapted to create smoke and to force the same into any inclosure, such for instance as a hole in the ground, or into the hollow of a tree, or into bee hives and the like.

A further object is to produce such a device in a simple, strong, durable and inexpensive construction.

Our invention consists of certain details of construction, hereinafter set forth, pointed out in our claims and illustrated in the accompanying drawings in which—

Figure I shows a transverse sectional view, taken on the line *a—a* of Fig. II; Fig. II shows a side elevation of our device, a portion of the same being in section; and, Fig. III shows our device provided with a draft producing device on one end and a smoke carrying hose on the other.

Our device consists of a hollow body portion adapted to contain the burning fuel designed to produce the smoke, and a draft producing portion designed to cause the fuel in the body portion to burn and to force the smoke from the body portion through a tube on the reverse end of the said body portion. The said body portion, indicated by the numeral 10 may be constructed in any desired shape, but preferably the cylindrical tubular is used, each end of the said tube being narrowed as shown at 11 and 12 respectively. The central or enlarged portion of the said tube is provided with a door 13 which is designed as a feed door through which fuel is placed within the receptacle 10. Between the feed door and each end of the receptacle, in its inner portion, are perforated plates 14 and 15 respectively, said plates being designed to provide ends for the fire box and the perforations, in one of said plates, being designed to provide a means for the intake of the draft produced by a bellows 16, or any other means, connected with one end of the body portion by a flexible tube or hose 17, and the perforations in the other plate being designed as an outlet for the smoke. Secured to the end, opposite to the one on which the draft producing mechanism is secured, we have provided a hose 18 and this said hose may be of any desired length and is designed to be forced into a hole in the ground, or the hollow of a tree, or into any place into which the smoke is desired to be forced. The door 13, which we employ, is so mounted upon the body portion 10 as to be practically air tight.

In practical operation, the receptacle being provided with fuel, the same is ignited and the door 13 closed. It is obvious that our device is portable and it is then carried to any place where smoke is desired. If it is desired to smoke an animal out of a hole in the ground the hose 18 is forced into the hole, any desired distance, and the bellows 16 on the other end is then operated with the obvious result that the smoke is forced through the perforations in the plate 15 and through and out of the hose 18 into the interior of the hole in the ground, and it is equally obvious that the animal in the hole will be either driven out or suffocated. Our device is also applicable for forcing smoke into hollow trees, or into bee hives or into any other place where smoke is desired. A goose necked hollow hook is sometimes used for grappling a hole in a tree at some distance above the ground, and holding the hose 18 in position, the smoke passing through the hose 18 and through the hollow hook into the hollow in the tree.

Having thus described our invention what we claim and desire to secure by Letters Patent of the United States is:

A device of the type set forth comprising a cylindrical body of integral formation having its ends formed cone-shaped and terminating in tubular parts of considerably less diameter than that of the main part of said body, a pair of perforated cylindrical plates of substantially the same diameter as the inner circumference of said body on the interior of said body disposed at the juncture of the main part of the body with its cone-shaped ends, which latter form shoulders restricting the outward movement of said plates, said body being formed with a comparatively large door opening, and a door for closing said opening; said perforated plates and the inner face of the walls of said body between said plates forming a fire chamber, said plates being removable and insertible through said door opening, and being normally held against said shoulders by the fuel in the fire chamber.

HENRY PINEGAR.

REUBEN $\underset{\text{mark.}}{\overset{\text{his}}{\times}}$ PINEGAR.

Witnesses:
    ZELL G. ROE,
    BLANCHE SEDGWICK.